United States Patent
Booe et al.

[11] 3,891,901
[45] June 24, 1975

[54] CAPACITORS WITH SPRAYED ELECTRODE TERMINALS

[75] Inventors: James M. Booe; Lawrence A. Landry, both of Indianapolis, Ind.

[73] Assignee: P. R. Mallory & Co. Inc., Indianapolis, Ind.

[22] Filed: Aug. 5, 1971

[21] Appl. No.: 169,554

Related U.S. Application Data

[63] Continuation of Ser. No. 13,688, Feb. 24, 1970, abandoned, which is a continuation-in-part of Ser. No. 732,928, May 29, 1968, abandoned.

[52] U.S. Cl. ............... 317/258; 317/260; 317/261
[51] Int. Cl. .............................................. H01g 1/14
[58] Field of Search ..................... 317/258, 260, 261

[56] References Cited
UNITED STATES PATENTS

| | | | |
|---|---|---|---|
| 1,479,315 | 1/1924 | Pickard | 317/261 |
| 2,972,570 | 2/1961 | Haas | 317/258 |
| 3,256,472 | 6/1966 | Centurioni | 317/260 |
| 3,260,904 | 7/1966 | Booe | 317/258 |
| 3,322,515 | 5/1967 | Dittrich | 317/258 UX |
| 3,346,789 | 10/1967 | Robinson | 317/258 |
| 3,360,701 | 12/1967 | Dornfeld | 317/261 |

FOREIGN PATENTS OR APPLICATIONS

253,552  11/1926  United Kingdom ................ 317/260

*Primary Examiner*—E. A. Goldberg
*Attorney, Agent, or Firm*—Charles W. Hoffmann; Robert F. Meyer; Donald W. Hanson

[57] ABSTRACT

In an electrostatic capacitor the edges of one electrode or set of electrodes are exposed at one portion of the capacitor and the edges of the other electrode or set of electrodes are exposed at another portion of the capacitor. At least one dielectric separates adjacent electrodes. A coating of nickel-aluminum material is applied to the exposed edges of both electrodes or sets of electrodes at different portions of the capacitor.

24 Claims, 10 Drawing Figures

PATENTED JUN 24 1975　　　3,891,901

SHEET　　1

INVENTORS
JAMES M. BOOE
LAWRENCE A. LANDRY
BY
Charles W. Hoffmann
ATTORNEY

PATENTED JUN 24 1975 3,891,901

SHEET 2

INVENTORS
JAMES M. BOOE
LAWRENCE A. LANDRY
BY
Henry W. Cummings
ATTORNEY

CAPACITORS WITH SPRAYED ELECTRODE TERMINALS

This application is a continuation of application Ser. No. 13,688 filed Feb. 26, 1970, now abandoned, which was a continuation-in-part of application Ser. No. 732,928, filed May 29, 1968, now abandoned.

BACKGROUND OF THE INVENTION

The present invention relates to a capacitor, more particularly, to both convolutely wound and stacked plate electrostatic capacitors having film-forming metal electrodes, noble metal electrodes and copper electrodes.

In several of the prior art electrostatic capacitors having aluminum electrodes, electrical contact with the electrodes is achieved by placing a conducting tab or tabs in contact with each electrode of a convolutely wound capacitor body. Separate tab or tabs make contact with or touch the separate foil electrodes by the exertion of a slight pressure between the adjacent turns of the convolutely wound capacitor body. Other types of terminal constructions are achieved by welding, soldering, riveting or staking the tab or tabs to the adjacent foil electrode.

Among the disadvantages of the above capacitor constructions is that generally the wound-in tabs are not bonded to the foil electrodes. If the tab is bonded to the foil electrodes, the bond strength between the welded, soldered, riveted and the like tab or tabs and the electrode or electrodes is mechanically weak, which may result in poor electrical contact between the electrode foil and the tab. The prior art constructions may result in separation of the tab or tabs from the foil electrode or electrodes even with normal handling.

In general, the tab type construction is employed in situations where the foil electrodes do not extend from the lateral side of the convolutely wound capacitor body. Therefore, one of the above enumerated methods of contacting the foil electrodes is generally used. Other disadvantages of the tab type construction appear in addition to the undesirable electrical and mechanical contact between the tabs and the electrode. Among the other disadvantages is that it is necessary to halt the winding operation at least twice to insert the tabs, a bulge appears in the winding where the tabs are located which may promote shorting between adjacent electrode foils and/or increase the housing area required for the capacitor body, and if the foil electrodes are about 0.00015 inch thick, the tab attachment is difficult if the tabs are to be welded to the foil electrodes.

Another disadvantage of the wound-in terminal attachment is that it is difficult to obtain satisfactory attachment of the capacitor body within the container housing the capacitor body. Generally, neither the tabs and the terminal leads nor the bond joint provides sufficient strength to securely retain the capacitor body in a determined position within the container. Consequently, ancillary retaining means such as packing and the like may be employed within the container to assure that the capacitor body is retained in a determined position within the container.

Another disadvantage of the above terminal attachments is realized when used with convolutely wound foil electrode electrostatic capacitors. The inductive characteristics of the convolutely wound capacitor at high frequency seriously affects the operating characteristics of the capacitor, such as, for example, the capacitor may not discharge its stored energy as rapidly as required at high operating frequencies such as about 1 to about 5 kilocycles and higher. To overcome the inductive effect experienced by convolutely wound capacitors having tab type construction, the capacitor may be wound so that the ends of the foil electrodes extend beyond the dielectric material, may be bent over, swaged or crushed in such a manner so as to attempt to afford physical contact between the adjacent bent over foil electrodes. A terminal lead may be attached by soldering to the swaged ends of the foil electrodes. The swaged foil electrode construction is moderately effective in lowering the inductive effect of the convolutely wound capacitor. It is thought that only moderate success is realized because intermittent bonding takes place between the contact and the foil electrode. If solder is used to attach the tab to the extended foil electrode, complete coverage by the solder to the bent over foil edges is not always accomplished. The lack of a strong bond and/or incomplete coverage by the solder of the electrode foil edges may be due, to some extent, to the presence of a metallic oxide film on the foil electrodes.

Since the electrodes are nearly always made of very thin aluminum and since this metal is quite difficult to solder because it inherently has a film of aluminum oxide on the surface, a special technique must be employed to obtain even a reasonable bond. This is accomplished by rubbing the aluminum surface with a soldering iron heated sufficiently to keep the solder in the molten condition. This is generally referred to as "solder scrubbing" and is a tedious and laborious operation. It is generally considered this rubbing action abrades the oxide away in small areas to permit some wetting of the aluminum with the molten solder. Although the swaging of the foil edges, coupled with the solder application, is moderately effective in reducing the inductive effect of the convolutely wound capacitor, the strength of the lead attachment by soldering may be low due to the difficulty in soldering to the aluminum. This is especially the case in making very small devices. Also, to reduce the inductance to a minimum, the ideal circumstance would provide for substantially complete bonding all along the edge of the foil with electrical bridging between adjacent turns.

One significant step toward minimizing the inductance of convolutely wound capacitors, and which is employed in the present art, is to spray the extended foil edges with a molten metal or alloy. The metals and alloys generally used have low or moderate melting points and are selected to afford some degree of solderability. The art also teaches the use of a first very light spray of some moderately high melting point metal such as Cu having a melting point of 1,083°C to give a scattering of unconnected metal particles over which a very low melting metal or alloy is sprayed. This technique is designated for convolutely wound capacitors employing low temperature thermoplastic dielectric films such as polystyrene on to which is vacuum deposited very thin layers of aluminum for the electrodes. With this type of construction, such special techniques and materials are probably helpful to prevent damage to the capacitor elements.

Generally, for the reason that virtually none of the prior art spray metals bond well to the conventional aluminum foil capacitor electrodes, mainly because of the everpresent aluminum oxide film, their use on constructions most favorable to them, namely where the foils extend appreciably from the device, the integrity of the bond is likely to be marginal. Even in this case, it is a troublesome operation in the manufacture of the device to insure acceptable lead attachment strength through the use of these metal and alloy spray deposits.

Furthermore, in small devices where the area for lead attachment is small, it is frequently difficult to obtain sufficient lead attachment strength to meet commercial requirements and other standards. Moreover, this difficulty is increased when the device must withstand severe conditions during use such as high shock and/or vibration. An explanation of the nature of the bonding of the prior art spray metals with the electrode edges will be given hereinafter.

The types of capacitors described hereinbefore are generally termed the "extended foil construction" by the industry. They are nearly always of a convolutely wound construction. Depending upon the size of the device and the precision employed in making the winding, the extent to which the foil edges protrude from the opposite ends will vary considerably. In very small windings where more precise techniques are generally employed, the foil edges may protrude only a few thousandths to about one thirty-second inch. In large windings, the foil edges may protrude as much as one-fourth inch and possibly higher. In making contact with these foil edges by spraying with the prior art metals and alloys, the nature of the attachment of the sprayed deposit with the foil edges is largely mechanical, with possibly a very slight degree of metallurgical bonding. This is the case whether the foil edges protrude perpendicularly from the body of the winding or are "swaged" or bent over before the metal spray is applied. However, there is a distinct difference in the degree of attachment as will be shown hereinafter.

In the case where the edges are "swaged" or bent over, the void space between the adjacent foil turns is greatly reduced, therefore, only a limited amount of the molten metal spray particles can enter the reduced openings between the foil turns, thus reducing the degree of mechanical holding. In the case where the foil edges are not swaged but are protruding substantially perpendicular to the capacitor body, then the molten metal spray particles traveling at appreciable velocity will enter the annular void area between the foil turns and upon impact they are forced against the foil surfaces and solidify and conform to all surfaces and irregularities thereof to produce a substantially all mechanical attachment.

In summary, the metal spraying of extended foils of convolutely wound capacitor bodies with metals of the prior art, a choice can be made between swaged or unswaged foil edges. If the foils are not swaged, a higher degree of mechanical attachment is achieved, however, there is the high risk of short circuiting the two capacitor electrodes by the metal spray particles contacting the embedded edge of opposite foil. If the foil edges are swaged, this largely prevents molten spray particles from reaching the embedded edge of the opposite foil electrode. A rather low order of attachment is achieved, however. In either case, there is very little if any metallurgical bonding between the spray deposit and the foil electrodes.

One most important aspect of the present invention is concerned with attachment to the edges of foil electrodes which do not appreciably protrude from the body of the capacitor. Often these electrodes are made of aluminum. In these new types of constructions virtually the only area of the foil electrodes exposed to which attachment can be made is the cross sectional area of the electrode. In this case, practically no attachment can be obtained by mechanical entanglement of the spray deposit with the electrode edges, thus in these new constructions the attachment must almost completely be achieved by some mechanism other than mechanical attachment. This implies that at least some degree of "weld bond" is required. In constructions of this type, if the prior art metals and alloys are employed for spraying, virtually no bond is obtained with the electrodes; consequently, a terminal lead cannot be attached to such aluminum electrodes.

Another and even more important aspect of the invention is where the electrodes are made of one of the refractory film forming metals such as tantalum. In these new constructions where the edges of the electrodes do not protrude from the body of the device, again there is only the cross sectional area to which attachment can be made.

Tantalum and other refractory film forming metals are extremely difficult to bond unless subjected to very high temperatures. The use of prior art spray metals offer virtually no bond with tantalum and other refractory film forming metals, regardless of whether the electrode edges protrude or not.

OBJECTS OF THE INVENTION

Accordingly, an object of the present invention is to provide a construction which overcomes the above enumerated prior art problems.

A further object of the present invention is to provide a capacitor and a method of manufacturing the same having film-forming metal electrodes, noble metal electrodes or copper electrodes, the electrical contact to said electrodes including a dense, substantially oxidation resistant, coating of high structural integrity.

Another object of the present invention is to provide an electrostatic capacitor having refractory film-forming metal electrodes.

Another object of the present invention is to provide for lead attachments to the electrodes of an electrostatic capacitor which forms a "weld bond" with the electrodes.

A further object of the present invention is to provide an improved capacitor having convolutely wound foil electrodes.

Yet another object of the present invention is to provide a method for conveniently and economically fabricating an electrostatic capacitor having aluminum foil electrodes.

Yet still another object of the present invention is to provide an improved convolutely wound electrostatic capacitor having improved electrical characteristics at high frequencies.

A further object of the present invention is to provide a capacitor having improved resistance to shock and/or vibration.

A further object is to provide a capacitor having low inductance which is capable of being charged and discharged at high repetition rates.

Another object of the present invention is to provide means for improved lead attachment for an electrostatic capacitor having swaged electrode edges.

Another object of the present invention is to provide means for improved lead attachment for an electrostatic capacitor having electrode edges which protrude perpendicularly from the capacitor body and which are not swaged.

Yet another object of the present invention is to provide means for lead attachment to the electrodes of a stacked foil electrostatic capacitor.

It is another object of the present invention to provide means for lead attachment to the edges of electrodes where there is little or substantially no protrusion of said electrodes from the capacitor body.

Other objects and advantages of the present invention will become apparent from the following description considered in conjunction with the accompanying Figures of the drawings and wherein like reference characters describe elements of similar functions therein, and wherein the scope of the invention is defined by the appended claims.

THE DRAWINGS

SUMMARY OF THE INVENTION

Figure 1:
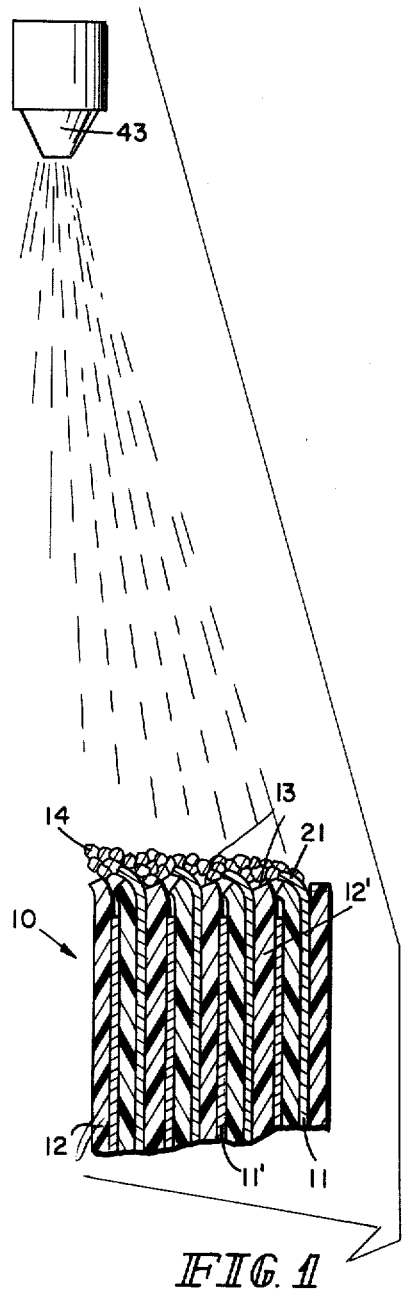
FIG. 1 is a schematic representation of applying a nickel-aluminum material to swaged edges of the foil electrodes of an electrostatic capacitor.
Figure 8:
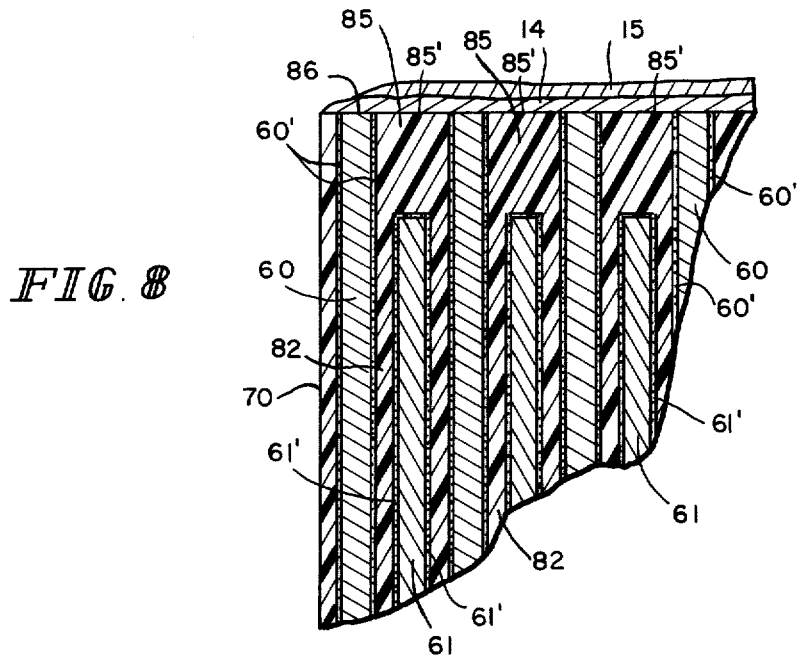
FIG. 8 a sectional thereof.

A new capacitor is provided comprising at least two adjacent, spaced apart, first and second metal electrodes such as $11^1$, 11 in FIG. 1 and 61, 60 in FIG. 8 are separated at least by one dielectric containing separator (12 in FIG. 1, 82 in FIG. 8) which is in contact with at least a portion of the electrodes. The dielectric separator layer has a first extension (12' in FIG. 1, 85 in FIG. 8) beyond the first electrode to define at the edge thereof a first separator surface (13 in FIG. 1, 85' in FIG. 8). The second electrode extends at least to the first separator surface, but does not extend substantially beyond the first separator surface in a direction parallel to the first electrode to define a first electrode surface (21 in FIG. 1, 86 in FIG. 8).

The separator layer also has a second extension beyond the second electrode to define a second separator surface at another side of the capacitor similar to the first separator surface. The first electrode extends at least to the second separator surface, but does not extend substantially beyond the second separator surface in a direction parallel to the second electrode to define a second electrode surface, similar to the first electrode surface.

A first nickel-aluminum deposit (14 in FIGS. 1 and 8) consisting essentially of about 50 to about 98 weight percent nickel is weld bonded to the first electrode surface and a second nickel-aluminum deposit consisting essentially of about 50 to about 98 weight percent nickel is weld bonded to the second electrode surface. Optionally, a second deposit of high melting metal (above about 775°C) may be applied to the nickel-aluminum deposits.

Generally speaking, the present invention relates to an electrostatic capacitor. Alternate electrodes project from one side of the capacitor. The remaining electrodes project from the other side of the capacitor. Dielectric means separate adjacent electrodes. The metal electrodes may be a film-forming metal, a noble metal or copper. Possible film forming metals include tantalum, titanium, aluminum, zirconium, hafnium and niobium. Suitable noble metals for the electrodes would be platinum, silver, gold, palladium and the like. Copper may also be used as the electrode material. Aluminum and tantalum are preferred electrode materials in some types of capacitors. A coating of nickel-aluminum is bonded to the edges of the electrodes. Leads are bonded to the nickel-aluminum layers.

DETAILED DESCRIPTION OF THE INVENTION

Referring now to FIG. 1, a partial sectional view of a convolutely wound capacitor body 10 is illustrated. The capacitor 10 consists essentially of metal foil electrodes 11 and 11' separated by a suitable dielectric 12. The electrode 11 may be the positive plate of the capacitor whereas the electrode 11' may be the negative plate of the capacitor when the capacitor is operated on direct current. The most common electrode material is aluminum foil. The preferred thickness range of the aluminum foil may range from about 0.00015 to about 0.010 inch. Aluminum foil having a thickness range of about 0.00025 to 0.002 inch is preferred in small electrostatic capacitors.

The dielectric 12 separates adjacent foil electrodes. The dielectric may be a plastic film material or the like. Suitable plastic film material dielectrics include but are not limited to polyester, polystyrene, polycarbonate, polyimide, polyparaxylylene, polytetrafluoroethylene, combinations of the plastic films and the like. Electrode separation may also be paper or a combination of the paper and the plastic film. When paper is used it is usually impregnated with a liquid dielectric such as oil or oil-wax combinations such as mineral oil, chlorinated diphenyl and the like. These liquid dielectrics may also be used with film dielectrics. Other dielectrics include the anodic films formed on the film forming metals. They are usually used in conjunction with other dielectric materials.

It will be apparent from FIG. 1 that the separating dielectric layer 12 has an extension 12' which extends beyond the edge of a first electrode 11' to define at the edge of the layer 12 a surface 13. Furthermore, a second electrode 11 extends at least to the surface 13 and beyond to define an electrode surface 21. The electrodes 11 are bent over or "swaged" so that they do not extend substantially beyond the separator surface 13 in a direction parallel to the first electrode 11'.

A suitable applicator for the nickel-aluminum such as a spray gun (not shown) including a spray head 43 may be used to apply, deposit or spray the metallic layer 14 over the swaged ends 21 of foil electrodes 11. A similar metallic layer (not shown) would be applied, deposited or sprayed over the swaged ends (not shown) of the electrode foil 11' projecting from the opposite end (not shown) of the capacitor body. The metallic layer is comprised of nickel-aluminum with unavoidable impurities. In addition, swaging the ends of the foil electrodes 11 may also swage the ends of the dielectric 12 in such a manner so as to substantially eliminate the possibility of the sprayed material contacting the edges of electrode foil ends 11' and hence short the adjacent electrode foils 11 and 11'. It is not our intent to eliminate the unswaged foil ends from the present invention. Unswaged foil ends are satisfactory if the dielectric covers or protects the edges of the alternate foil electrodes not to be coated with the nickel-aluminum material.

The best results are thought to be achieved using aluminum particles and nickel particles such that there is at least 50% by weight of nickel present in the nickel-aluminum material. The upper limit of nickel is about 98% by weight. The preferred range of composition is about 75% by weight of nickel and to about 95% by weight nickel with the remainder aluminum and impurities. Generally the two metals are in intimate contact with each other when flame sprayed onto the electrode edges. The particles of nickel and the particles of aluminum when flame sprayed jointly may form, to some extent, an alloy and/or intermetallic compound of the two metals. It is thought that the alloy and/or intermetallic compound formation reaction may be exothermic in nature and therefore assist in maintaining high temperatures in the individual metallic particles in the flame as they are propelled toward the electrodes. Also, it may be the molten state of the combined metal particles provide a condition to promote direct combustion of the aluminum or "Thermite" reduction of any nickel oxide by the aluminum. Either reaction would account for the highly incandescent nature of the particles. Properly applied, the nickel-aluminum layer makes a strong bond with the electrode edges.

The composition of the nickel-aluminum terminal layer comprises 50% to about 98% by weight nickel, the balance aluminum with unavoidable impurities, including at least some oxide material.

It is not known why the nickel-aluminum material provides a strong bond with the foil electrodes when the separate metals of nickel and aluminum individually flame sprayed do not. Spraying any of the common metals such as copper, zinc, and tin over the foil electrodes also provides a termination having poor bond strength.

The phase diagram of the nickel-aluminum system appears to be quite complex. Three different nickel-aluminum intermetallic compounds have been identified in some nickel-aluminum layers. One of the nickel-aluminum intermetallic compounds appears to be $Ni_2Al_3$ containing about 41% by weight aluminum. Another nickel-aluminum intermetallic compound appears to be NiAl containing about 32% by weight aluminum and still another nickel-aluminum intermetallic compound appears to be $NiAl_3$ containing about 58% by weight aluminum. In the applied layer, it is thought that at least one and possibly more of the intermetallic compounds of nickel and aluminum are present, with those having lesser amounts of aluminum likely to predominate.

It has been found it is more advantageous if the nickel and the aluminum are not pre-alloyed but introduced in the spray as separate metals, such as in the powder form or in the wire form. This can be done for example with one or more nickel and/or aluminum sheaths packed with nickel and/or aluminum particles. The nickel-aluminum material may be applied in powder form by using an arc-plasma flame spray or by using other powder spray methods which may operate for example by using a gas selected from the group consisting of acetylene, hydrogen, propane, natural gas and the like mixed with oxygen and/or air for the flame to heat the powder particles with a jet of gas to rapidly propel the molten particles to the edges of the foil electrodes. The powder form of the material may be nickel coated with aluminum and/or aluminum coated with nickel.

In any case, the nickel-aluminum material is in the form of heated particles when sprayed from the spray head 43 toward the extending lateral edges of the foil electrodes 11. The heat is sufficient at least to melt the surface of the individual particles and preferably the heat is sufficient to melt a substantial portion or all of the particles. A flame spray temperature of roughly 2,000°C or higher has been found to be satisfactory.

The coating of the nickel-aluminum may be applied in one or several passes by the flame spray gun over the edges of the electrode foil in order to minimize the effect of heat from the sprayed compound on the capacitor body. The flame spray gun may be held for example, about 4 to about 8 inches away from the foil electrode edges.

It was found that one of the most advantageous bonds between the applied layer and the capacitor electrodes is realized using a coating or layer having a thickness of about 0.001 to about 0.006 inch. Coats of less than 0.001 inch thick are not contemplated in order to avoid the possibility of reduced bond strength. Coats of more than 0.006 inch thick may be used, however, increased thickness does not appear to greatly increase the bond strength between the edges of the electrode foil and the layer.

Figure 2:
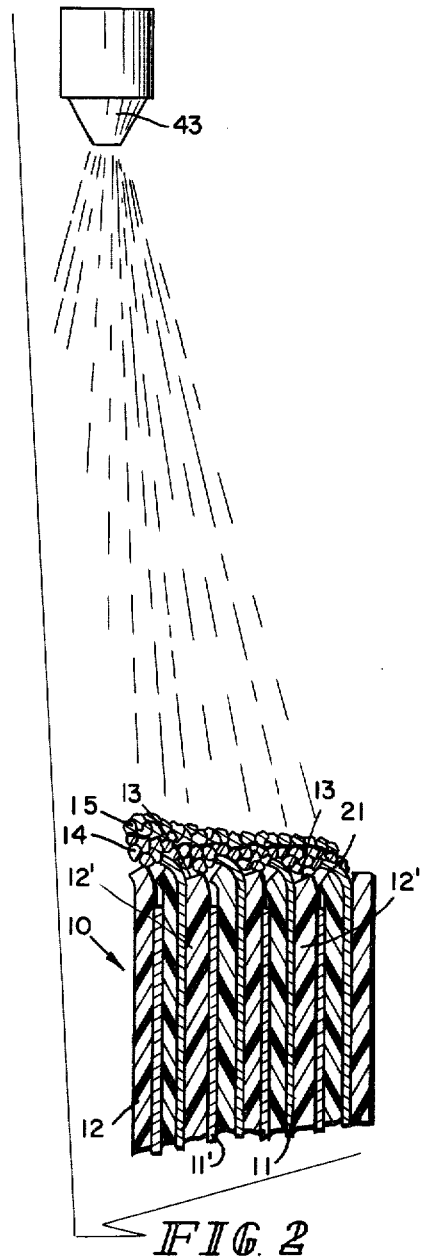
FIG. 2 is a schematic representation of the electrostatic capacitor illustrated in FIG. 1 further showing the applications of an optional layer over the layer of the nickel-aluminum material thereby providing a coating more solderable than the nickel-aluminum layer.

It has been found that flame spraying a second layer 15 (FIG. 2) of a solderable electrically conductive metal over the layer of nickel and aluminum provides a layer which is more readily solderable than is the layer of the nickel-aluminum material. The optional second layer should be a metal or metal alloy having a sufficiently high melting point as to not melt or dissolve in the solder to a large extent. This layer may be selected from the group consisting of copper, nickel, gold, silver, cobalt and alloys thereof having a melting point above about 775°C. The metal layer 15 may have a thickness of about 0.001 to about 0.006 inches. In some constructions the thickness may however be appreciably greater.

Figure 3:
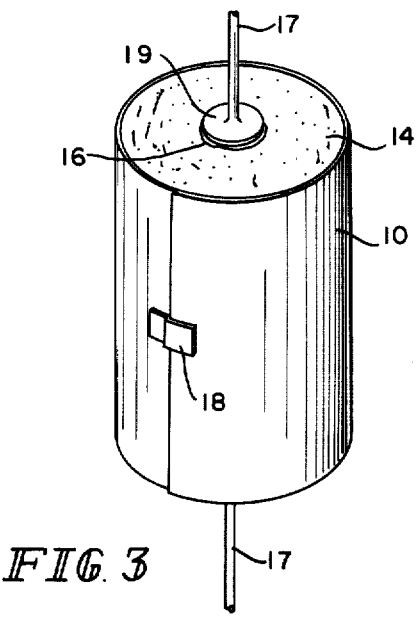
FIG. 3 is a perspective view of a convolutely wound electrostatic capacitor after application of the nickel-aluminum to the swaged electrode foil edges with an axial terminal lead bonded thereto.

Referring now to FIG. 3, the convolutely wound capacitor body 10 has a plurality of convolutely wound aluminum foil electrodes (not shown) separated by any one of the dielectric materials (not shown) mentioned hereinbefore. The convolutely wound capacitor body is retained in its cylindrical shape by any convenient means such as retaining tab 18, adhesive or the like.

The nickel-aluminum is sprayed over the ends of the convolutely wound capacitor so as to electrically bridge the adjacent turns of the projecting aluminum foil electrode, thereby enhancing the high frequency characteristics of the capacitor and providing a termination adherently bonded to the electrode foil. The foil electrodes may be swaged in the manner discussed hereinbefore. A terminal lead 17 having a small head section 19, compared to the total area of the end of the capacitor is connected to the layer of nickel-aluminum by any suitable material 16 such as tin base solder or the like.

Figure 4:
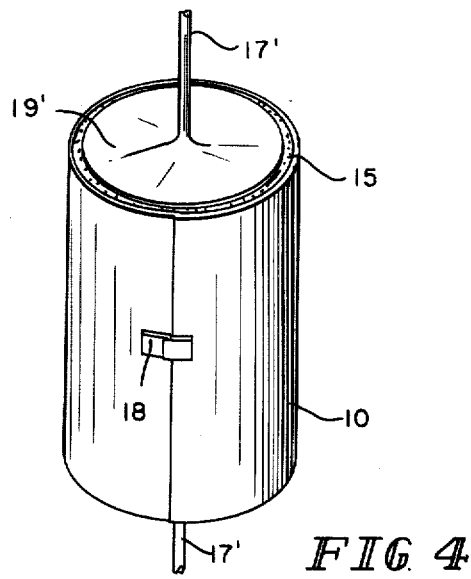
FIG. 4 shows the convolutely wound capacitor illustrating a large headed axial lead connected to a copper layer sprayed over the layer of the nickel-aluminum.

FIG. 4 shows a capacitor body 10 similar to the one shown in FIG. 3. A second layer 15 of copper is sprayed on the nickel-aluminum to facilitate attachment of the terminal lead 17'. The terminal lead 17' includes a much larger head section 19' than the head section 19 illustrated in FIG. 3. The larger head construction is desirable where high lead strength is required for anchoring the capacitor in its container where the capacitor must withstand high shock and vibration.

Figure 5:
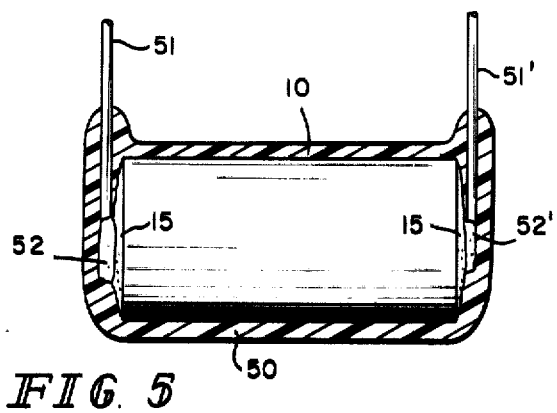
FIG. 5 shows a capacitor body having convolutely wound foil electrodes and terminal leads perpendicular to the major axis of the capacitor body and encapsulated within a housing.

FIG. 5 shows a capacitor body 10 encapsulated in a plastic housing material 50 made of a thermoplastic for example polycarbonate, polypropylene, polyethylene and the like or a thermosetting resin such as epoxies, phenolics and silicones. The terminal leads 51 and 51' of the capacitor are solderable at 52 and 52' to the copper layer 15 overlying the layer of nickel-aluminum.

Figure 6:
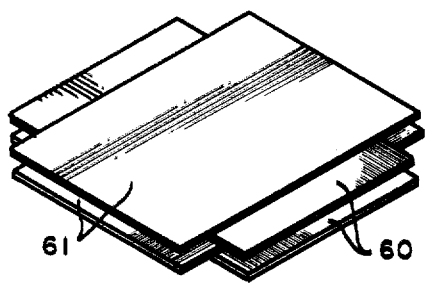
FIG. 6 is a perspective view of an electrostatic capacitor having a multiplicity of stacked foil electrodes.
Figure 7:
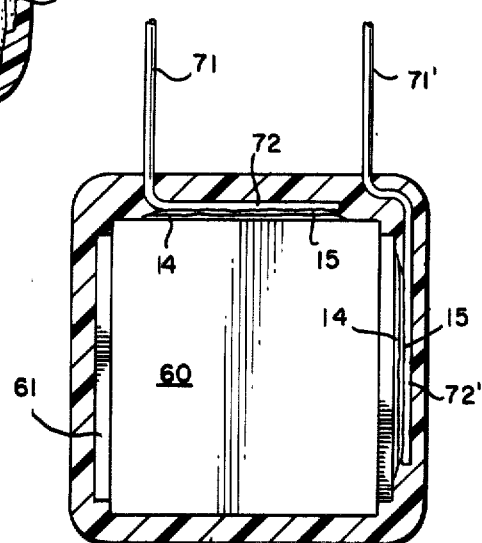
FIG. 7 shows a stacked foil configuration of FIG. 6 having leads attached and encapsulated within a housing.

FIGS. 6–8 show a new type of capacitor construction in which a multiplicity of rectangular foil electrodes are alternately cross-stacked. In FIG. 6 for clarity only 4 electrodes are shown. Each electrode is covered with an anodic oxide dielectric film (FIG. 8) except the ends of the electrodes where terminals are attached. The electrodes are closely bonded together with a suitable dielectric bonding resin 82 in FIG. 8 by heat and pressure causing excess resin to fill the spaces between the extending ends of all alternate electrodes. Upon cutting or trimming all protruding electrode ends to the same plane, the laminating resin remains flush with the electrode ends leaving only the cross sectional area of each electrode to which attachment can be made. The two sets of electrodes 60 and 61 are preferred to be made of aluminum or tantalum however certain other film forming metals may be used. Electrode thickness may range from 0.00025 inch to .010 inch but a preferred thickness range is .0005 inch to .002 inch.

FIG. 7 shows a top view of the stacked foil arrangement of FIG. 6 encapsulated into suitable housing 70 fabricated from any suitable thermoplastic or thermosetting resin material. Alternate sets of foil electrodes 60 and 61 are coated with the nickel-aluminum 14 in the manner described hereinbefore. A second layer of copper 15 is sprayed over the layer of nickel-aluminum. Terminal leads 71 and 71' are soldered to the copper as shown at 72 and 72'.

FIG. 8 is a cross sectional view of the capacitor in FIGS. 6 and 7. This is a parallel plate laminated structure having a first set of foil electrodes 61 and a second set of foil electrodes 60 terminate at a different side (FIG. 6) of the capacitor. An auxiliary dielectric resin layer shown at 82 in greatly enlarged thickness separates the electrodes and, bonds the electrodes together. This resin layer also extends outward beyond the ends of the set of electrodes 61 to cover the recessed ends of electrode set 61. This extension is shown at 85 and the edge of extension 85 defines a surface 85'. Both sets of electrodes have an anodic oxide dielectric film, 60' and 61' on all surfaces except the outer edges 86 where termination is to be made. At these extremities, the electrode ends and the resin is cut or trimmed to give a plane surface 85', 86 where the nickel-aluminum sprayed layer 14 is applied to electrically connect all electrodes of the second set 60 and provide means for termination. An optional layer 15 of a readily solderable metal such as copper may be applied. The first set of electrodes 61 are likewise treated at another side of the capacitor.

Figures 9, 10:
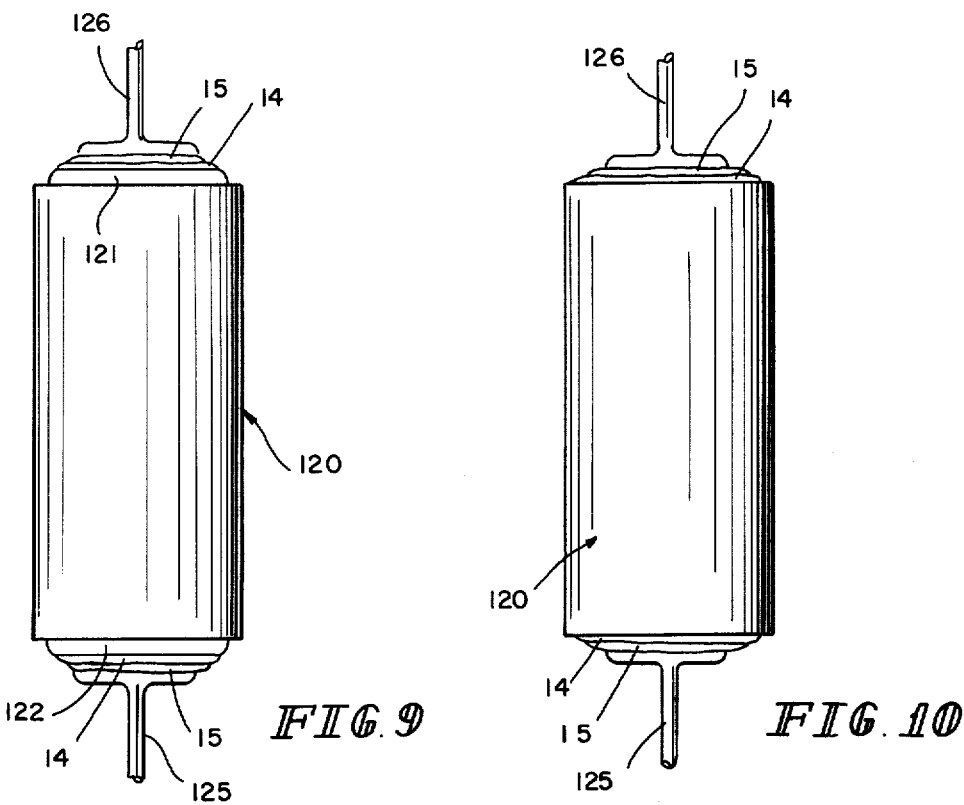
FIGS. 9 and 10 are views of capacitors tested in Examples 4 and 5.

FIGS. 9 and 10 show a small convolutely wound capacitor 120 having a polymeric film dielectric (not shown). In FIG. 9, the edge of one of the electrode foils 121 protrudes from one end of the winding and the other electrode foil, 122, protrudes from the other end. Foil ends 121 and 122 may be preferably swaged or bent over. In both FIGS. 9 and 10, a nickel-aluminum spray 14 is applied to the foil ends at both ends of the capacitor. An optional layer of a readily solderable metal 15 such as copper may be applied over the nickel-aluminum. Terminal leads 125 and 126 are attached by soldering.

FIG. 10 shows a construction similar to that shown in FIG. 9 except the ends of the foil electrodes do not protrude from the two ends of the windings. In this construction the edge of one electrode foil terminates flush with the edges of the polymeric dielectric film (not shown) and the edge of the other electrode foil terminates flush with the edges of the dielectric film at the other end of the winding. The opposite edges of both foil electrodes are recessed (not shown) between the dielectric films at both ends of the winding. These recessed edges may be covered with an insulating material.

EXAMPLES

A number of capacitors of different types were employed to assess the bond strength between the capacitor electrodes and the attached leads. A number of metals were sprayed onto the electrode edges to which suitable test leads were attached by soldering. A "Schoop" or wire spray process was used to apply the spray deposits.

A Metco Inc. type 4E Metallizing Gun was used. In operation, the metal spray wire (⅛ inch D) is fed via an air turbine driven ratchet into an oxygen/acetylene flame. There it is melted into particles which are forcibly blown against the part to be coated by the gas-air blast. The air, oxygen and acetylene flow rates were adjusted for each metal according to recommendations given by the Manufacturer of the gun. The wire feed rate is prescribed for each metal in order to obtain best spray characteristics, but may be varied slightly.

The gun was mounted on a motor-driven slide so that the traverse rate could be varied from 0 to 11 inches per second. This determines the time each portion of the surface is exposed to the metal spray, hence chiefly determines the thickness of the coating applied each time the spray passes over the surface. For thick coatings, it is best to apply several thin layers one upon another to prevent overheating the part. Other parameters which determine the metal deposition rate are the wire feed rate and the distance from the part to the gun.

The parts were masked mechanically to delineate the area to be sprayed. This area was one-half inch along the edge for the laminated units, and the entire end (three-eighths inch) of the wound-foil units.

In the examples given hereinafter the amount of metal spray applied to the capacitor electrodes as reported in the tabular data was obtained by adjusting the distance between the spray gun and the capacitor and the number of passes. In all cases the gun distance was 6 inches except where a very light copper spray was applied, in which case the distance was 24 inches. The number of passes of the spray over the capacitors ranged from 1 to 4.

All lead pull tests were conducted with a standard Dillon tensile test machine.

The following materials were used in Examples II through V.

The flame-spray metals were all 1/8 inch diameter wires. They included: Aluminum, 99 + % pure; Copper, commercial purity, oxygen-free grade 99.8 + %, Zinc, commercial purity 99.9 + %; and Tin, commercial purity 99.8 + %; and Metco 405 which is a nickel-aluminum agglomerate powder of about 300 mesh size packed in an aluminum sheath 1/8 inch O.D. to give a total of about 20% Al and 80% Ni.

The solders and fluxes used included Kester 60/40 tin/lead cored with Kester 44 flux (a mildly activated resin flux) — for general use and Kester 60/40 tin/lead cored with "Special Al" flux (an active flux) — used only to solder directly to sprayed nickel-aluminum deposits.

EXAMPLE I

This example is presented mainly to show the superior electrical properties of capacitors made with the extended foil construction over that of similar capacitors made with the wound-in tab construction. In Table I are given values for capacitance and dissipation factor for three capacitors measured at 120 Hz, 10,000 Hz and 20,000 Hz. These capacitors were rated 8 uf, 330 VAC. They were made by winding in tabs to make touch contact with the electrode foils. These units were typical convolutely wound aluminum foils separated with Kraft paper and impregnated with a chlorinated diphenyl liquid dielectric. The electrode edges did not extend from the windings.

In Table II are values of similar measurements of the same type of capacitors but made with the extended foil. Before impregnating, the foil edges were sprayed with a coating of nickel-aluminum with an over-spray of copper to which the leads were soldered. Although the rated capacitance of these units was 6 uf instead of 8 uf, this would not alter the difference in the observed electrical properties.

TABLE I

| Unit | Frequency-Hertz (cycles/sec.) | Capacitance (microfarads) | % Dissipation Factor |
|---|---|---|---|
| A | 120 | 8.21 | 0.6 |
|   | 10K | 8.08 | 9.4 |
|   | 20K | 7.90 | 17.6 |
| B | 120 | 8.35 | 0.6 |
|   | 10K | 8.22 | 9.4 |
|   | 20K | 8.04 | 17.6 |
| C | 120 | 8.24 | 0.6 |
|   | 10K | 8.11 | 9.4 |
|   | 20K | 7.92 | 17.6 |

TABLE II

| Unit | Frequency-Hertz (cycles/sec.) | Capacitance (microfarads) | % Dissipation Factor |
|---|---|---|---|
| A | 120 | 6.06 | 0.98 |
|   | 10K | 5.99 | 1.26 |
|   | 20K | 5.93 | 1.25 |
| B | 120 | 6.22 | 0.84 |
|   | 10K | 6.14 | 1.26 |
|   | 20K | 6.08 | 1.25 |
| C | 120 | 6.06 | 0.99 |
|   | 10K | 5.98 | 1.26 |
|   | 20K | 5.92 | 1.25 |

It is obvious from comparing the observed characteristics of these two types of construction that there is less decrease in capacitance and especially much less increase in the dissipation factor with increase in frequency in those units having the extended foil construction and a metal spray deposit to bond to the foil and produce an electrical shorting bridge between the turns to minimize the inductance. With further increase in frequency above that employed in making the measurements reported in Tables I and II, there would be an even greater difference in the electrical properties.

EXAMPLE II

In this example, lead pull strength tests are reported on small .1 uf polymeric film dielectric, convolutely wound capacitors having extended foil construction. Lead attachment strength values given in Table II are with units onto whose unswaged edges various metals were sprayed.

In Table IV are pull strength values on similar units except the edges of the foils were "swaged" or bent over before the metal sprays were applied. These capacitors measured about 1 inch long and 3/8 inches diameter and having a mandrel hole of about .1 inch in diameter in the center. The results of lead pull tests of each group in Tables III and IV represent values for two leads on each of four capacitors. After spraying the ends of the units with the respective metals and alloys, a nail having a flat head about 3/8 inch diameter was soldered to each end of the capacitors with 60/40 solder. The lead pull tests were conducted using a Dillon tensile test machine.

Groups A-U (Table III) and A-S (Table IV) were sprayed with nickel-aluminum to the extent of .18–.20 grams per square inch followed by a copper spray of .20–.22 grams per square inch. This gave a total thickness of .006–.008 inch based on a plane surface coverage.

Groups B-U and B-S were sprayed with nickel-aluminum to the extent of .38–.42 grams per square inch giving a thickness of .006–.008 inch based on a plane surface coverage. No copper was applied.

Groups C-U and C-S were sprayed very lightly with copper to give a scattering of copper particles, followed by a zinc spray to the extent of .24–.30 grams per square inch for a total thickness of .004–.006 inch based on a plane surface coverage.

Groups D-U and D-S were sprayed with aluminum to the extent of .6–.8 grams per square inch followed by a tin spray to the extent of .8–1.0 grams per square inch for a total thickness of .03–.04 inch based on a plane surface coverage. This represents very thick spray deposits relative to the other groups.

Groups E-U and E-S were sprayed with aluminum to the extent of .05-.06 grams per square inch followed by a tin spray to the extent of .35-.42 grams per square inch for a total thickness of .006-.008 inch based on a plane surface coverage.

TABLE III

Lead Pull Tests on wound foil "unswaged" units.
(All values in lbs.)

| Group | Range | Average | Average P.S.I.* |
|---|---|---|---|
| A-U (Ni-Al+Cu) | 24-97 | 61.8 | 560 |
| B-U (Ni-Al) | 14-60 | 37.0 | 340 |
| C-U (Cu+Zn) | 11-28 | 21.2 | 190 |
| D-U (Al+Sn) | 15.7-30 | 22.4 | 200 |
| E-U (Al+Sn) | 7.5-25 | 14 | 125 |

TABLE IV

Lead Pull Tests on wound foil "swaged" units.
(All values in lbs.)

| Group | Range | Average | Average P.S.I.* |
|---|---|---|---|
| A-S (Ni-Al+Cu) | 20-42 | 29.5 | 270 |
| B-S (Ni-Al) | 26-34 | 23.8 | 220 |
| C-S (Cu+Zn) | 3-9.5 | 7.7 | 70 |
| D-S (Al+Sn) | 2.3-14 | 5.7 | 65 |
| E-S (Al+Sn) | 4.7-12 | 7.5 | 68 |

*Based upon total sprayed area of 0.11 in².

From the data given in Tables III and IV it is quite evident the thin spray coating of Ni-Al, especially with a copper overspray, has a substantially higher bond strength than that obtained with the prior art spray materials een when they are applied as heavy deposits to fill in between the foils to enhance the mechanical attachment aspect. Also, these data show that when the foil edges are bent over or "swaged," the amount of spray material which can enter between the foils to provide holding by mechanical entanglement is greatly reduced, thus the degree of attachment with the prior art spray materials is marginally low while that with the Ni-Al is quite acceptably high.

EXAMPLE III

In this example, four groups of a new type of capacitor made with laminated aluminum foil electrodes as shown in FIGS. 6, 7 and 8 were employed to compare lead bond strength of various metal spray deposits to the edges of the electrodes. Six capacitors, were used in each group, each having two leads, which were pull tested to give 12 values per group.

These .1 uf capacitors were made by alternate crossstacking 32, .750 inch wide × .002 inch thick aluminum foil electrodes each having an anodic dielectric film on all surfaces except the cut ends where lead attachments were made. The electrodes were closely bonded together with polysiloxane resin by the agencies of heat and pressure causing excess resin to fill the spaces between the extending ends of all alternate electrodes. Upon cutting or trimming all protruding electrode ends to the same plane, the laminating resin was flush with the electrode ends leaving only the crosssectional area of each electrode to which attachment could be made. When each edge of the capacitor was masked so that one-half inch of the edge length was presented to the metal spray, the total spray area was about .032 square inches. Since the resin occupied half of this area between the electrode ends this provided only about .016 square inches of aluminum surface. This structure can be seen in FIG. 8, from which it is obvious that little or no attachment to the electrodes can be obtained by mechanical entanglement of the spray deposit with the electrodes.

In Table V are given lead pull test values for the four groups. After spraying, a one-half inch wide copper strip suitable for pull testing, was soldered to the spray deposits of each specimen with 60-40 solder. Two groups of capacitors were sprayed with Ni-Al while the other two groups were sprayed with prior art metals as follows.

Group F capacitors were sprayed with nickelaluminum to the extent of .16-.18 grams per square inch followed by a copper spray to the extent of .13-.14 grams per square inch for a total spray thickness of .006-.007 inch.

Group G capacitors were sprayed with nickelaluminum to the extent of .18-.20 grams per square inch for a thickness of .002-.003 inch.

Group H capacitors were sprayed lightly with copper to the extent of .06-.07 grams per square inch followed by a zinc spray to the extent of .18-.21 grams per square inch for a total thickness of .004-.006 inch.

Group I capacitors were sprayed with aluminum to the extent of .05-.06 grams per square inch followed by a tin spray to the extent of .35-.42 grams per square inch for a total thickness of .006-.007 inch.

TABLE V

Lead Pull Tests on Laminated Aluminum Foil Capacitors.
(All values in lbs.)

| Group | Range | Average | Average P.S.I.** |
|---|---|---|---|
| F (Ni-Al+Cu) | 4.8-38 | 19 | 600 |
| G (Ni-Al) | 6.7-35 | 18.2 | 570 |
| H (Cu+Zn) | 0 -6.6 | 2.4* | 75* |
| I (Al+Sn) | 0 (All leads too weak to test) | | |

*data for 9 leads - 3 leads too weak to test
**Based upon total spray area of .032 in².

Examination of the data in Table V will show a striking superiority of the spray bond of the nickelaluminum over that of the prior art sprays, primarily because mechanical entanglement of the sprayed deposit with the electrode ends can not take place to any appreciable extent and that the nickel-aluminum offers superior bonding.

EXAMPLE IV

In this example, laminated foil electrode capacitors were employed having the same type of construction as that given in Example III and shown in FIGS. 6-8 except anodized tantalum foil electrodes were used. By any other means, it is extremely difficult to obtain a bond to this metal unless very high temperatures are employed.

Two capacitors designated J and K were constructed by alternate cross stacking 24 foils .625 inch wide × .001 inch thick tantalum foils, each having an anodic dielectric oxide film on all surfaces except the cut ends where lead attachments are made. The electrodes were closely bonded together with polyphenylene sulfide resin by heat and pressure causing the excess resin to fill the spaces between the extending ends of all alternate electrodes. Upon cutting or trimming all protruding electrode ends to the same plane the laminating resin was flush with the electrode ends leaving only the cross sectional area of each electrode to which attachment could be made. These capacitors were .030 inch thick and the length of the spray pattern on each edge was one-half inch giving an attachment area of about .015 square inch.

To two of the adjacent edges of these capacitors, about .003 inch thick spray deposit of nickel-aluminum was applied followed by about .003 inch of copper. To another edge sufficient aluminum was sprayed to the extent it would have yielded .6–.8 grams per square inch on a plane surface had all the deposit adhered. To the fourth edge tin was sprayed which would yield a deposit of .8–1.0 grams per square inch had all the deposit adhered.

Two other capacitors, designated L and M were made similar in all respects to units J and K except they were made with 50 electrodes each having a thickness of .0005 inch. A copper strip, ½ inch wide was soldered to the spray deposits with 60-40 solder for the pull tests.

Lead pull data on these capacitors are given in Table VI. Only one Ni-Al+Cu attached lead on each unit was pull tested. The other lead was left attached for future examination.

TABLE VI

Lead Pull Tests on Laminated Tantalum Foil Capacitors.
(All values in lbs.)

| Unit | Lead Attachment | Lead Bond Strength | PSI* |
|---|---|---|---|
| J | Al Spray | 0 (too weak to test) | 0 |
| J | Sn Spray | 0 (too weak to test) | 0 |
| J | Ni–Al+Cu Spray | 68.3 | 4600 |
| J | Ni–Al+Cu Spray | not tested | — |
| K | Al Spray | 0 (too weak to test) | 0 |
| K | Sn Spray | 0 (too weak to test) | 0 |
| K | Ni–Al+Cu Spray | 42.5 | 2800 |
| K | Ni–Al+Cu Spray | not tested | — |
| L | Al Spray | 0 (too weak to test) | 0 |
| L | Sn Spray | 1.5 | 100 |
| L | Ni–Al+Cu Spray | 52.3 | 3500 |
| L | Ni–Al+Cu Spray | not tested | — |
| M | Al Spray | 0 (too weak to test) | 0 |
| M | Sn Spray | 0 (too weak to test) | 0 |
| M | Ni–Al+Cu Spray | 32 | 2100 |
| M | Ni–Al+Cu Spray | not tested | — |

*Based on total sprayed area.

From the data given in Table VI shows the Ni-Al spray attachment to give very high bond strength even to a refractory metal such as tantalum.

EXAMPLE V

In this example data are presented showing lead pull strength with various metal and alloy sprays on the ends of another new type of capacitor. In these constructions, very thin electrode foils are employed and they may be of the laminated type but most generally are made by convolutely winding. The electrodes do not employ an anodic dielectric film on their surfaces but rather they employ an organic polymeric film dielectric. This construction is shown in FIG. 10. In this case also, only the cross sectional area of the electrode foil is available for attachment.

Two groups of capacitors of four units each were made by winding two polymeric films, 15/16 inch wide × .0005 inch thick with two aluminum foil electrodes 13/16 inch wide × .00025 inch thick so that one edge of one foil terminated at one edge of the films and one edge of the other foil terminated at the edge of the films on the opposite end of the roll. The other foil edges were recessed in the windings. To protect the recessed edges of these electrodes and to fill any and all other voids in the ends of the windings, the units were vacuum impregnated with epoxy resin which was subsequently cured or hardened. The ends of all capacitors were cut or trimmed with a sharp cutter to insure the film and foil edges were flush with each other. The wound assemblies were about 1 inch long and three-eighths inch in diameter. After the spray materials were applied to the ends of the capacitors as described hereinafter the heads of flat headed nails having head diameters of about three-eighths inch were soldered to the spray deposits with 60-40 solder. Pull tests were conducted by clamping the capacitor body and the shank of one of the nails in the jaws in a Dillon tensile test machine and pulling to rupture the metal spray bond. The results in Table VII represent pull test values of two leads for each of four capacitors in each group.

Group N capacitors were sprayed with aluminum to the extent of .05–.06 grams per square inch followed by a tin spray to the extent of .35–.42 grams per square inch.

Group O capacitors were sprayed with nickel-aluminum to the extent of .18–.20 grams per square inch followed by a copper spray to the extent of .20–.22 grams per square inch.

TABLE VII

Lead Pull Tests on wound film dielectric capacitors having no extension of the electrode foils from the capacitor body. (lbs.)

| Group | Range | Average | Average P.S.I.** |
|---|---|---|---|
| N (Al+Sn) | 0–3.4 | 1.8* | 17 |
| O (Ni–Al+Cu) | 13.8–60.5 | 42.0 | 380 |

*avg. of 6 values - 2 leads too weak to test
**Based on total sprayed area of 0.11 in².

What is claimed is:

1. A capacitor comprising:
   at least two adjacent, spaced apart, first and second metal electrodes;
   at least one separating dielectric layer in contact with at least a portion of said electrodes;
   said layer having a first extension beyond a first edge of said first electrode to define, at the edge of said first extension, a first separator surface;
   said second electrode extending to said first separator surface, but having essentially no protrusion beyond said first separator surface, thereby defining a first electrode surface;
   a dielectric material covering said first edge of said first electrode and filling any void space between the first edge of said first electrode and said first separator;
   said separator layer having a second extension beyond a first edge of said second electrode to define at the edge of said second extension, a second separator surface;
   said first electrode extending to said second separator surface but having essentially no protrusion beyond said second separator surface, thereby defining a second electrode surface;
   a dielectric material covering said first edge of said second electrode and filling any void space between the first edge of said second electrode and said second separator surface;
   a first deposit of nickel-aluminum material consisting essentially of about 50 to 98 weight percent nickel, weld-bonded to said first electrode surface to provide a terminal; and a second deposit of nickel-aluminum material consisting essentially of about 50 to 98 weight percent nickel, weld-bonded to said second electrode surface to provide a terminal, the terminal to electrode bond strength being at least about 300 psi.

2. A capacitor comprising:

at least two adjacent, spaced apart, first and second metal electrodes;

at least one separating dielectric layer in contact with at least a portion of said electrodes;

said layer having a first extension beyond a first edge of said first electrode to define, at the edge of said first extension, a first separator surface;

said second electrode extending to said first separator surface, but having essentially no protrusion beyond said first separator surface, thereby defining a first electrode surface;

a dielectric material covering said first edge of said first electrode and filling any void space between the first edge of said edge of said first electrode and said first separator surface;

said separator layer having a second extension beyond a first edge of said second electrode to define at the edge of said second extension, a second separator surface;

said first electrode extending to said second separator surface but having essentially no protrusion beyond said second separator surface, thereby defining a second electrode surface;

a dielectric material covering said first edge of said second electrode and filling any void space between the first edge of said second electrode and said second separator surface;

a first deposit of nickel-aluminum material consisting essentially of about 50 to 98 weight percent nickel, weld-bonded to said first electrode surface;

a second deposit of nickel-aluminum material consisting essentially of about 50 to 98 weight percent nickel, weld-bonded to said second electrode surface; and a layer of readily solderable material over at least one of said deposits of nickel-aluminum material, said solderable material having a melting point above about 775°C.

3. A capacitor according to claim 1 in which said nickel aluminum material is coated with a relatively high melting point readily solderable material and an electrode to terminal bond strength of at least about 500 psi is obtained.

4. A capacitor according to claim 1 in which said electrodes are made of tantalum, said nickel-aluminum material is coated with a relatively high melting point readily solderable material and an electrode to terminal bond strength of at least about 1,000 psi is obtained.

5. A capacitor according to claim 1 in which said electrodes are made of tantalum, said nickel-aluminum material is coated with a relatively high melting point readily solderable material and an electrode to terminal bond strength of at least about 2,000 psi is obtained.

6. The capacitor of claim 1, wherein the metal of said electrodes is selected from the group consisting of film-forming metals, noble metals and copper.

7. The capacitor of claim 6, wherein at least one of said electrodes is a film-forming metal selected from the group consisting of aluminum, tantalum, titanium, zirconium, hafnium and niobium.

8. The capacitor of claim 7, wherein said capacitor is an electrostatic capacitor having electrodes selected from the group consisting of aluminum and tantalum.

9. A capacitor according to claim 1, wherein said electrodes are swaged.

10. The capacitor of claim 1, wherein said electrostatic capacitor is convolutely wound.

11. The capacitor of claim 1, wherein said electrostatic capacitor includes substantially flat, stacked electrode plates.

12. A capacitor according to claim 1, wherein said electrodes do not project from the capacitor body.

13. A capacitor according to claim 12, wherein attachment is made to the edge portion only of said electrodes.

14. A capacitor according to claim 1, in which a lead is attached directly to said nickel-aluminum material.

15. A capacitor according to claim 14, in which said attachement is a welded joint.

16. A capacitor according to claim 14, in which said attachment is a solder joint.

17. A capacitor according to claim 1, in which said dielectric layer is at least in part a formed oxide on a film-forming metal.

18. A capacitor according to claim 1, in which said dielectric layer is at least in part on a polymeric film on a formed oxide.

19. A capacitor according to claim 10, having little increase in dissipation factor with increase in frequency.

20. A capacitor according to claim 8, wherein the electrodes are made of aluminum.

21. A capacitor according to claim 8, wherein the electrodes are made of tantalum.

22. A capacitor according to claim 1, wherein a layer of readily solderable material overlies each of said deposits of nickel-aluminum material.

23. A capacitor according to claim 6, wherein said electrodes are made of a noble metal selected from the group consisting of platinum, silver, gold, and palladium and alloys thereof.

24. A capacitor according to claim 23, wherein said electrodes are platinum.

* * * * *